United States Patent

Buse

[11] Patent Number: 4,466,508
[45] Date of Patent: Aug. 21, 1984

[54] LUBRICATION DEVICE

[75] Inventor: Frederick W. Buse, Allentown, Pa.

[73] Assignee: Ingersoll-Rand Company, Woodcliff Lake, N.J.

[21] Appl. No.: 444,847

[22] Filed: Nov. 26, 1982

[51] Int. Cl.³ .............................................. F01M 9/06
[52] U.S. Cl. .................................... 184/13.1; 384/404
[58] Field of Search .................. 184/11 R, 13.1, 11 B, 184/11 D, 6.26; 384/404

[56] References Cited

U.S. PATENT DOCUMENTS

| | | | |
|---|---|---|---|
| 119,412 | 9/1871 | Sault | 384/404 |
| 314,475 | 3/1885 | Powers et al. | 384/404 |
| 427,575 | 5/1890 | Huber | 384/404 |
| 546,659 | 9/1895 | Fehr | 384/404 X |
| 739,631 | 9/1903 | Ahlheim | 384/404 |
| 800,861 | 10/1905 | Marshall | 184/13.1 X |
| 923,652 | 6/1909 | Heinz | 384/404 |
| 1,291,157 | 1/1919 | Robson | 184/11 R |
| 2,749,842 | 6/1956 | Angell et al. | 384/404 X |
| 2,950,943 | 8/1960 | Forrest | 184/13.1 X |

*Primary Examiner*—David H. Brown
*Attorney, Agent, or Firm*—R. Falkowski

[57] ABSTRACT

A pump has a rotating shaft supported by a pair of bearings. An oil sump is located below the shaft and contains oil for lubrication of the bearings. Roll pins are inserted into respective holes in the shaft to extend into the oil sump during rotation of the shaft to thereby throw oil for lubrication onto the bearings.

4 Claims, 2 Drawing Figures

LUBRICATION DEVICE

This invention relates to lubrication systems for rotating devices, such as pumps, that have a shaft supported by bearings that require oil lubrication.

A typical way to lubricate bearings in pumps or similar devices is to have an oil sump and some means for getting oil from the oil sump onto the bearings. The devices consist of either complicated oil flow systems or of relatively simple oil flinging devices that extend into the oil sump. The prior art teaches that special scooping devices or elongated surfaces are necessary to provide adequate dispersion of the oil onto the bearings. For example, the single-piece slip on flinger usually requires extra machining of the shaft between bearings so it can be slipped into position and usually requires a special holding device like a set screw or collar. If made of elastomer, it requires the shaft to be machined to obtain the proper interference between shaft and flinger.

With this invention adequate lubrication of bearings in pumps can be obtained by a relatively simple and inexpensive device that only requires drilling and/or tapping into a standard shaft and does not require special shape or tooling as does a single piece slip-on flinger made of metal or elastomer.

The objects and advantages of the invention will be apparent from the following description and drawings.

Figure 1:
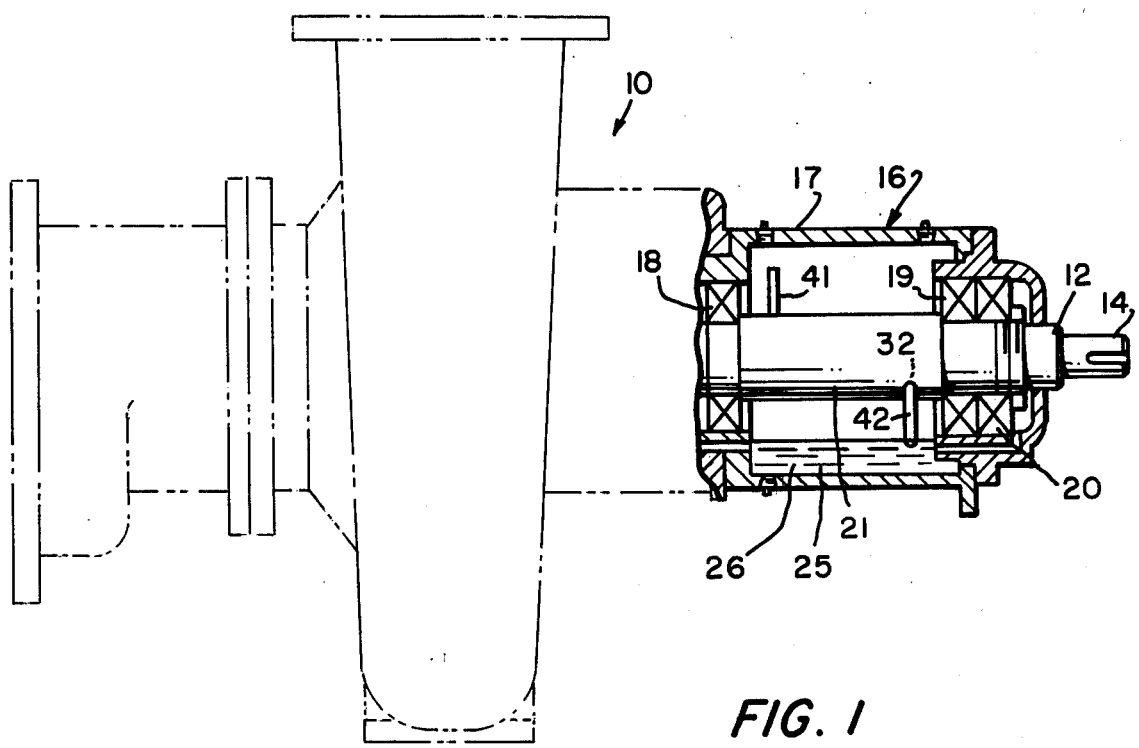
Figure 2:
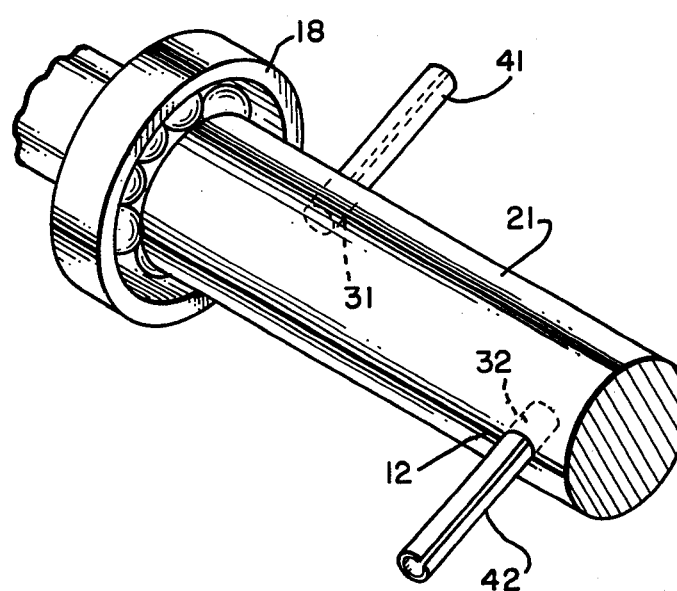

FIG. 1 is a partial side view of a pump with its bearing and support assembly shown in cross-section, and FIG. 2 is a perspective view of a portion of the shaft portion of the shaft assembly shown in FIG. 1.

Referring to FIG. 1, a pump assembly 10 of any type known in the art has a shaft 12 extending outwardly to intersect with some driving device such as a motor (not shown) at a connecting end 14. The shaft extends through a bearing support section 16 that comprising a housing 17 that substantially surrounds the shaft and bearing assembly. Bearing support section 16 comprises bearings 18, 19 and 20 at the ends of a central section 21 of shaft 12. An oil sump 25 is enclosed within chamber 17 and contains oil 26 at a selected level in the oil sump.

Referring to FIG. 1, and FIG. 2 in which bearing 18 and central portion 21 of shaft 12 are shown, a pair of holes 31 and 32 are drilled into shaft central portion 21. Shaft holes 31 and 32 are drilled 180 degrees apart and are located at a lateral position selected to be near to and at a selected distance from bearings 18 and 19, respectively, and have a length and diameter selected to enable insertion of pins 41 and 42. The distance of the pins from the bearings is selected so that oil thrown upwardly reaches the bearings and by spacing the pins apart the dual throwing effect results in better lubrication and lower bearing temperature. The pins are of any known type, such as roll pins, and material, such as steel, that may be pressed into and retained within the holes during operation. The lengths of the pins are selected to extend downwardly into oil sump 25 to contact the oil at the respective ends and thereby toss oil up into the chamber for lubrication of the bearings.

The pins are forced, or may be threaded, into the holes to be retained therein. The use of such pins enables a range of lengths that allow for deeper emersion and greater variance in oil level within the sump without causing detrimental operation that could adversely affect the bearings. The assembly of the bearing is greatly simplified because it does not require an enlarged bearing or housing diameter to assemble it into the sump, and since the pins are a distance from each other, the shaft can be maneuvered or snaked into sumps having special configurations.

I claim:

1. A lubrication system for a rotating shaft support assembly having a shaft extending between two ends supported by a bearing at each end, said system comprising:

an oil sump positioned below the shaft support assembly having oil stored to a selected level below the shaft, a first hole and a second hole in the shaft, said holes each at a selected distance from a respective bearing and extending part way into the shaft and having a depth and width adapted to receive and retain a pin, and a pin inserted into each hole having a length selected to extend below the oil sump level during a selected portion of rotation of the shaft.

2. A lubrication system according to claim 1 wherein said holes are at a selected distance apart and from each of the bearings and positioned to be 180 degrees apart in radial position.

3. A lubrication system according to claim 2 wherein said pins are roll pins.

4. A lubrication system according to claim 2 the pins are adjacent to the respective bearings.

* * * * *